Nov. 4, 1958 — L. F. GRIFFITH — 2,858,849
MULTI-POSITIONAL CONTROL VALVE
Filed Feb. 28, 1955 — 2 Sheets-Sheet 1

INVENTOR,
LEONARD F. GRIFFITH
BY *Flam and Flam*
ATTORNEYS

INVENTOR,
LEONARD F. GRIFFITH

ATTORNEYS.

United States Patent Office 2,858,849
Patented Nov. 4, 1958

2,858,849

MULTI-POSITIONAL CONTROL VALVE

Leonard F. Griffith, Glendale, Calif., assignor to General Controls Co., Glendale, Calif., a corporation of California Application February 28, 1955, Serial No. 491,091

3 Claims. (Cl. 137—620)

This invention relates to a hydraulic system, and particularly to a control valve for desirably positioning a movable hydraulic mechanism such as used for operating a load by fluid pressure.

In hydraulic or pneumatic systems, intended to operate at pressures of the order of 3000 to 5000 pounds per square inch, the control valve used for appropriately directing the pressurized fluid must be capable of reliable operation. It is an object of the present invention to provide a simple and effective control valve that operates at high pressures.

It is another object of this invention to provide a compact control valve of this character, and that may be quickly operated and only by a slight effort.

It is another object of this invention to provide a novel and simple movable control element. For this purpose, a pivotally mounted tubular valve member is provided, one end of which continuously communicates with one motor port, and the other end of which may be placed in registry with a pressure or return port opening into an arcuately formed segmental spherical surface, or which may be closed.

It is another object of this invention to provide a control valve of this character that has simple provisions for preventing an undue rise in pressure of the fluid communicating with the interior of the control element. For this purpose, the tubular valve element forms a relief valve that moves from the spherical surface upon an undue rise in pressure to communicate with the space in which the spherical surface is exposed.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings.

Figure 1:
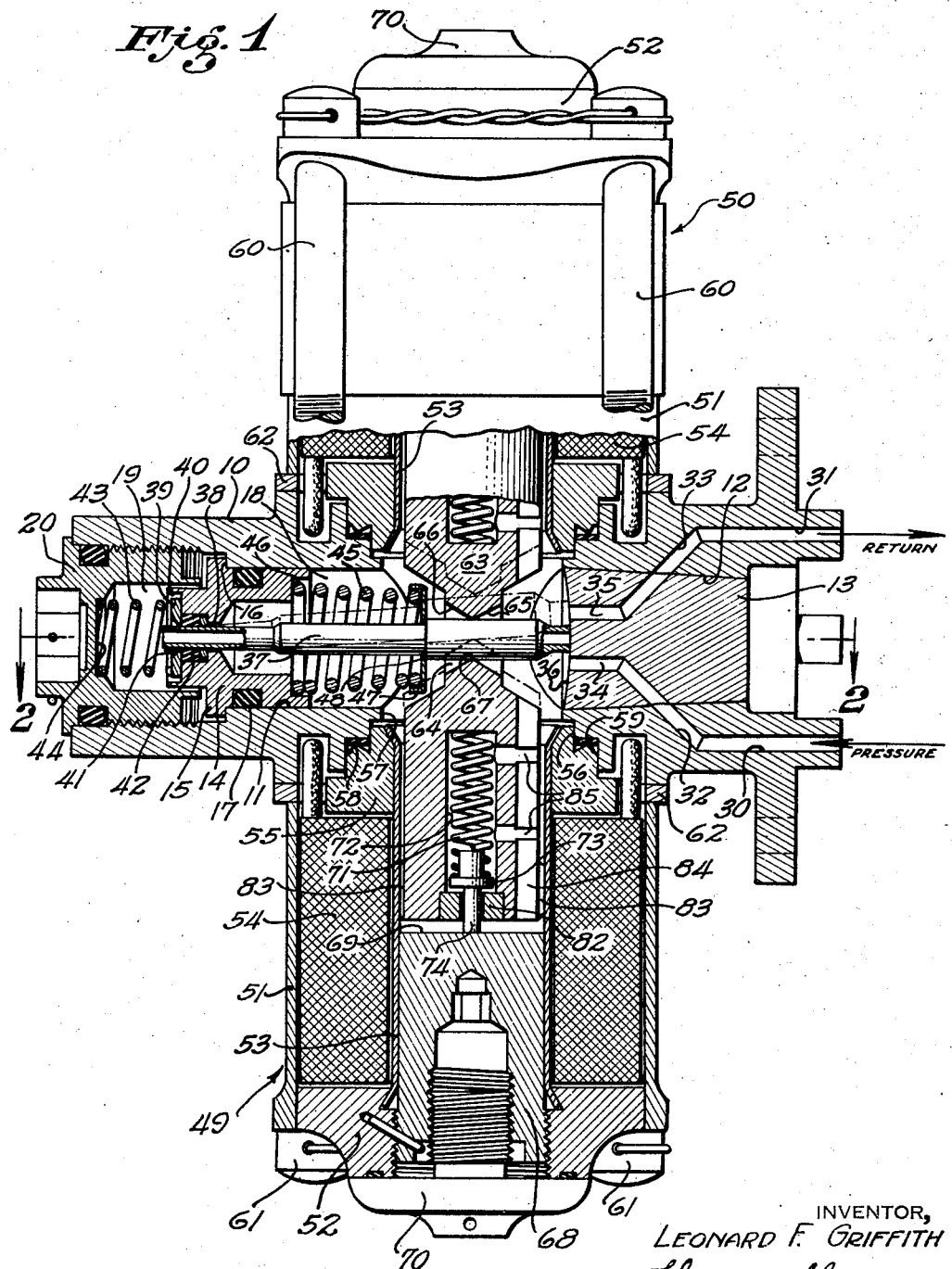
Figure 1 is a fragmentary sectional view of a valve structure incorporating the present invention, a schematic diagram being shown in association with the valve structure.

A valve body 10 has a longitudinal bore 11 opening exteriorly of the body at the left-hand end thereof. Coaxial with said bore, at the right-hand end of the body 10, as viewed in the drawings, there is a surface 12 of frusto-conical form, converging outwardly of the body 10 and opening exteriorly thereof.

A frusto-conical plug 13, having a taper corresponding to that of the surface 12, is seated therein. The plug 13 is in sealing engagement with the surface 12.

A cub 14 is located in the bore 11 and is in sealing relationship with the walls thereof. The cup has a radial flange 15 (Fig. 2) abutting a shoulder 16 formed intermediate the length of the body aperture 11 to limit movement of the cup 14 in one direction. A resilient O-ring 17, accommodated in a peripheral groove of the cup 14, maintains sealing relationship between the cup 14 and the bore 11.

The cup 14 cooperates with the plug 13 to define a central valve chamber 18.

An auxiliary or second valve chamber 19 is formed on that side of the cup 14 remote from the chamber 18. The chamber 19 is closed by a recessed plug 20 threadedly received in the left-hand end of the body aperture 11.

Figure 2:
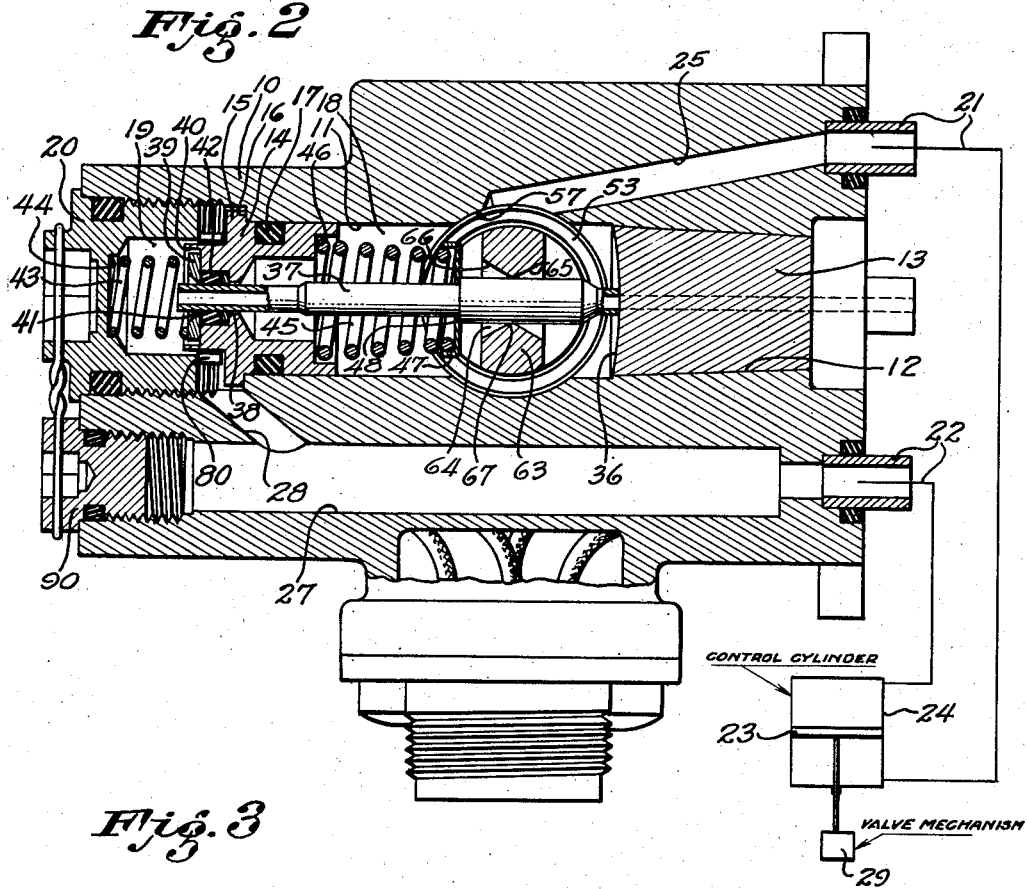
Fig. 2 is a sectional view, taken along the plane indicated by line 2—2 of Fig. 1.

The valve chambers 18 and 19 are respectively in continuous communication with hydraulic lines 21 and 22 (Fig. 2). These lines may be connected to spaces on opposite sides of a piston 23 of a control cylinder 24. For this purpose, the body 10 has an exteriorly opening oblique passageway 25 (Fig. 2) intersecting the central valve chamber 18. The fluid line 21 connects with the exterior opening of the oblique passageway 25.

The auxiliary chamber 19 is in communication with an elongate bore 27 spaced from and paralleling the bore 11. A transverse port 28 of the body 10 connects the chamber 19 with the bore 27. The bore 27 opens in the right-hand end of the valve body 10 and is in communication with the hydraulic line 22. The left-hand end of the paralleling bore 27 is sealed by a plug 90.

Communication between the transverse port 28 and the chamber 19 is established via an annular space defined by an interrupted end flange 80 of the end fitting or plug 20, through the interrupted flange 80, and along the exterior of the cup 14 and into chamber 19 in the recessed end plug 20.

Depending upon the pressure and flow characteristics of the fluid in the respective chambers 18 and 19, the position of the control cylinder piston 23 is adjusted. The piston 23 may operate any reciprocable mechanism, such as a valve device 29.

The flow of fluid can take place in either direction through lines 21 and 22 correspondingly to move the piston 23.

For supplying fluid under pressure to either of the chambers 18 or 19, a port 30 in the right-hand wall of the valve body 10 is provided (Fig. 1). This port 30 may be connected to the outlet side of a pump, or to any other suitable source of pressure. Similarly a port 31 is provided in the right-hand wall of the body 10, the port 31 returning to a fluid reservoir or the low pressure side of the hydraulic supply system. The ports 30 and 31 are located on opposite sides of the body bore 11.

Oblique inner ends 32 and 33 of the respective ports 30 and 31 open into diametrically opposite portions of the frusto-conical surface 12 of the body aperture 11. The ports 30 and 31 are in registry with ports 34 and 35, respectively, of the plug 13. Both these plug ports 34 and 35 of the plug 13 open in the end surface 36 of the plug that is exposed in the central valve chamber 18.

For optionally establishing communication of the pressure and return ports 34 and 35 with either the chamber 18 or 19, a pivotally movable tubular control member 37 is provided (Fig. 1). It extends longitudinally of the chamber 18 from the surface 36 of the plug 13 through an aperture 38 in the cup 14 that separates the chambers 18 and 19.

The control member 37 opens at its left-hand end into the auxiliary chamber 19.

The control member 37 is pivotally supported near its left-hand end by the aid of a plate 39 accommodated in a recess 40 in that end of the cup member 14 exposed in the auxiliary chamber 19. The left-hand end of the control member 37 passes through an annular knife edge 41 formed on the plate 39.

An O-ring 42, surrounding the control member 37, is in annular engagement with the cup member 14 and the exterior surface of the control member 37, and is maintained in place by the plate 39.

A compression spring 43, seated in a recess 44 of the end fitting 20, abuts the plate 39 and urges the cup 14 to its inwardmost position. The control member 37 is thus supported for pivotal movement on an axis transverse to bore 11.

The O-ring 42 prevents communication between the chambers 18 and 19 axially along the exterior surface of the control member 37.

As shown most clearly in Fig. 1, the right-hand end of the control member 37 may be moved about its transverse axis so as optionally to place it in registry with either of the ports 34 or 35.

In order to provide sealing engagement between the right-hand end of the control member 37 and the plug 13 in which the pressure and return ports 34 and 35 open, the surface 36 of the plug 13 is arcuately ground and polished to be in the form of a spherical, or cylindrical, segment, the center of curvature of which corresponds to the point about which the control member 37 pivots. The end annular surface of the control member 37, in engagement with the surface 36 of the plug 13, is correspondingly ground and polished. An accurate operating fit is thus provided between the relatively movable control member 37 and the plug 13.

A compression spring 45, seated against a shoulder 46 of the cup 14, engages a spring retainer 47 carried intermediate the length of the control member 37. The retainer 47 abuts the annular exterior shoulder 48 of the control member 37. Accordingly, the spring 45 urges the control member 37 toward the right in a direction corresponding to engagement between the end surface of the control member 37 and the plug surface 36.

By virtue of the precise engagement of the control member 37 with the plug surface 36, no substantial leakage normally occurs past the end surface of the control member 37. Accordingly, the auxiliary chamber 19 and the hollow portion of the control member 37 are normally out of communication with the central valve chamber 18. The auxiliary chamber 19 can normally be placed in communication only with the pressure port 34 or the return port 35.

If the control member 37 is moved to the upper position, such as is shown in phantom line in Fig. 1, the control member 37 is in registry with the return ports 35, 33, 31.

Accordingly, the auxiliary chamber 19 that communicates with the space above the piston 23 of the control cylinder 24 (Fig. 2) is exhausted. Correspondingly, the pressure ports 30, 32 and 34 are exposed in the central valve chamber 18, and communicate with the space on the lower side of the piston 23 of the control cylinder 24 via the oblique port 25.

In a similar manner, when the control member 37 is moved to the lower position, it is in registry with the pressure ports 30, 32 and 34.

In this position, the auxiliary chamber 19 of the space above the control cylinder 24 is supplied with pressure. The return ports 35, 33, 31 are then exposed in the central chamber 18. Accordingly, the space beneath the piston 23 of the control sylinder 24 is exhausted via the line 21, the oblique port 25, the central chamber 18, and the return ports 35, 33, 31; and the space above the piston 23 is pressurized via pressure ports 30, 32, 34, the hollow control member 37, chamber 19, ports 28, 27, and the line 22.

In order to position the control member 37 about its transverse axis, electromagnet structures 49 and 50, supported on diametrically opposite sides of the casing 10 and chamber 18, are provided. The electromagnet structures 49 and 50 includes cylindrical casings 51 and end caps 52, both of magnetic material, as well as hollow sleeves 53 supported by the caps 52 coaxially of the casings 51, and coils 54 carried in the space between the housings 51 and hollow sleeves 53.

Annular plates 55, of magnetic material, press-fitted about the inner ends of the sleeves 53, are respectively telescopingly accommodated in outwardly opening recesses 56 of the body 10.

The body 10 has apertures 57 establishing communication between the bottom of the recesses 56 and the central valve chamber 18. The apertures 57 are in communication with the interior of the sleeves 53 of the electromagnets.

The plates 55 have annular edges 58 abutting annular sealing rings 59 supported by the body 10 about the recesses 56. Bolts 60, received in appropriate threaded apertures of the body 10 (not shown), have heads 61 engaging the end caps 52 of the electromagnet structures 49 and 50. The electromagnets 49 and 50, as well as end edges of the casings 51, draw the electromagnets into firm engagement with the body 10.

The annular sealing rings 59 confine the communication of the fluid of the central valve chamber 18 to the interior of the hollow sleeves 53. Sealing rings 62 are also provided between the inner end edges of the cylindrical casings 51 and the body 10.

A symmetrical electromagnet plunger 63 extends diametrically across the central valve chamber 18 and is received at its opposite ends in the respective sleeves 53. Sets of angularly spaced fins 83 at opposite ends of the plunger 63 guide the plunger in the sleeves 53, the plunger otherwise having clearance in the sleeve.

The plunger 63 has a central transverse aperture 64 defined by converging frusto-conical surfaces 65 and 66 forming a knife edge 67. The control member 37 passes through the plunger 63 and is in engagement with the knife edge 67.

Upward movement of the plunger 63 causes pivotal movement of the control member 37 in a direction to place the hollow interior of the control member 37 in registry with the return port 35. Downward movement of the plunger 63 causes pivotal movement of the control member 37 in a direction to place the hollow interior of the control member 37 in registry with the pressure port 34. The limits of movement of the plunger 63 are defined by plugs 68 of magnetic material, accommodated in the ends of the sleeves 53.

The plugs 68 are in threaded engagement with the caps 52 and form a part of the electromagnetic circuit. The threaded engagement between the plugs 68 and the caps 52 serves as a means for adjusting the position of the end surfaces 69 that form stops for the plunger 63. Accordingly, by accurate adjustment of the position of the plugs 68, the limited positions of the plunger correspond precisely to registry between the control member 37 and the pressure and return ports 34 and 35, respectively.

Cap screws 70 are in threaded engagement with the plugs 68 and serve to lock the plugs 68 in their adjusted positions.

Accordingly, upon alternate energization of the coils 54 of the electromagnets 49 and 50, the control member 37 is placed in registry either with the pressure or return port 34 or 33. The effort required to move the plunger is slight, especially since the area of engagement between the control member 37 and the plug 13 is slight.

Centralizing springs 71 for the plunger 63 are accommodated in elongated end opening longitudinal recesses 72 of the plunger 63. The springs 71 at their inner ends abut the bottom of the respective recesses. The outer ends of the springs 71 abut flanges 73 of spring retaining members or pins 74. The spring retainers 74 are guidingly accommodated in the respective recesses 72.

When the plunger is in intermediate position, the shanks of the spring retainers 74 respectively abut the surface 69 of the stop plugs 68. The intermediate position of the plunger corresponds to a position of the control member 37 in which the end of the control member 37 is closed by engagement with that portion of the plug surface 36 between the pressure and return ports 33 and 34.

The springs 71 are so mounted on the plunger 63 that the plunger is centralized by a positive force, all independently of the relative characteristics of the respective springs. Thus, for example, should the plunger 63 move upwardly, the force of the lower spring otherwise urging the plunger upwardly is entirely relieved. The upper spring then is unopposed by the lower spring in exerting a force tending to move the plunger 63 downwardly toward its intermediate position.

To accomplish this purpose, plates 82 are secured in the end openings of the plunger recesses 72. The plates have apertures through which the shanks of the spring retaining pins extend. The plate 82 for the lower spring 71 has a slight lost motion connection with the flange 73 of the retainer 74 so that the retainer 74 is moved out of engagement with the end surface 69 of the stop plug 68 after a slight upward movement of the plunger 63. The reaction of the force of the spring 71 is thus transferred from the plug 68 to the plunger 63 itself, and the spring 71 of the electromagnet 49 is then ineffective further to urge the plunger upwardly. Upon such upward movement of the plunger 63, the spring retaining member 74 at the other end of the plunger will continue to engage the end wall of its corresponding stop plug, and hence the spring 71 thereby supported biases the plunger 63 toward its central position without opposition from the other spring.

Accurate centralizing can be effected by radial adjustment of the plugs 68 that threadedly engage the cover flanges 52. Such adjustment is effected by turning the plugs in or out, thereby defining the relative degree of compression of the respective spring 71 at central position.

The position of the plunger 63 at which the reaction of the spring is transferred to the plunger 63 corresponds to a position of the control member 37 before control member 37 moves into registry with the return or supply port. A positive returning force thus occurs prior to movement of the control member 37 from intermediate position.

Symmetrical conditions apply when the plunger moves downwardly, in which case the functions of the respective springs 71, spring retaining members 74, and plates 82 interchange.

In order to ensure that the plunger 63 can rapidly move in accordance with the energization of the electromagnets, provisions are made so that the fluid may readily flow into and out of the spaces between the ends of the plunger 63 and the corresponding stop plugs 68 and also into and out of the spring recesses 72. For this purpose, both parts of the plunger 63 have slots 84 each extending longitudinally of the plunger from the respective ends to the central aperture of the plunger 63. Also, radial ports 85 connect the slots 84 with the spring recesses 72. The plunger 63 is capable of moving between limiting positions in a time interval of the order of one hundredth of a second. Quite accurate control of the position of the hydraulic mechanism can be achieved.

In the intermediate position shown, the control member 37 is not in registry with either the pressure or return port 34 or 33, the end surface of the control member 37 abutting the surface 36 of the plug 13 intermediate the pressure and return ports 33 and 34.

Accordingly, the auxiliary chamber 19 is sealed, and a definite volume is provided for the fluid in the auxiliary chamber 19, the hydraulic line 22, and the space above the piston 23 of the control cylinder 24. Thus, the piston 23 is positively maintained in position when the control member 37 is in the intermediate position shown. Furthermore, by carefully operating the electromagnets 49 and 50, any desired definite position of the piston 23 can be achieved.

In this position, both the pressure port 34 and the return port 33 are exposed in the central valve chamber 18. In the central position, the liquid used in the load system is sealed although the pump system is left in fully operative position. The pressure port thus by-passes to the return port through chamber 18 without applying pressure in the hydraulic line 21 communicating with the space beneath the piston 23 and the control cylinder 24. The control valve thus makes it possible in a simple manner for the control cylinder 24 to be locked in an intermediate position.

When the space above the piston 23 of the control cylinder 24 is sealed by the control member 37 being in a central position, a rise in temperature of the fluid so sealed is accompanied with corresponding rise in the pressure.

Figure 4:
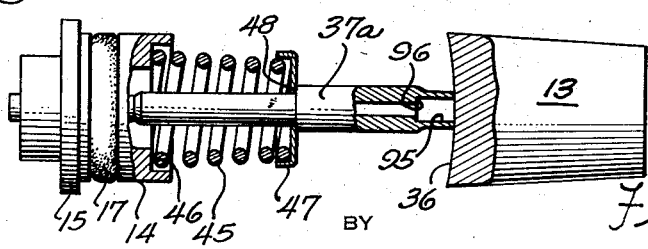

It may be desirable to limit the pressure in the closed system upon such an occurrence. For this purpose, a slightly modified control member 37a, shown in Fig. 4, may be provided. The end 95 of the bore of the control member 37a at the plug surface 36 is enlarged so that an increased area of the plug surface 36 is in registry with the member 37a. A shoulder 96 opposed to the surface 36 of the plug 13 is formed.

Upon an increase in pressure of the fluid trapped in the auxiliary chamber 19 and in the hollow interior of the control member 37a, the fluid exerts a force on the control member 37a at the shoulder 96 in a direction corresponding to movement of the control member 37a away from the seat 36. If the pressure in the closed system rises to a predetermined value, as compared with the force of the spring 45, the control member 37a moves away from the surface 36 of the plug 13 to permit relief of the pressure. Relief of the pressure permits the spring 45 to return the member 37a back into engagement with the plug surface 36. Thus, the position of the load piston 23 (Fig. 2) is substantially independent of changes in temperature.

Figure 3:
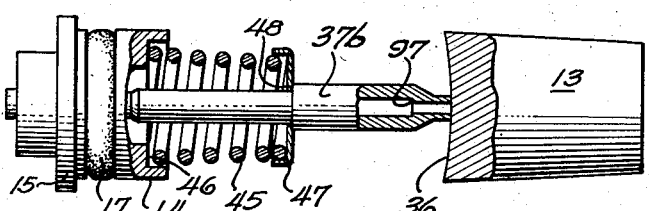
Figs. 3 and 4 are fragmentary sectional views of a portion of the valve apparatus, showing modified forms thereof.

In the form shown in Fig. 3, a control member 37b has the end of its bore diminished so that the area of the plug surface in registry with the interior of the member 37b is reduced. A shoulder 97 facing in the same direction as the surface 36 of the plug 13 is formed intermediate the member 37b. Accordingly, in the present instance, upon a rise in pressure in the closed system, the control member 37b is urged further into engagement with the seat 36, and no escape of the fluid in the closed system may take place despite a rise in pressure therein.

The control valve is extremely compact; only slight effort is required to operate the valve. The parts are readily removable for inspection or replacement.

The inventor claims:

1. In a hydraulic system adapted to position a load: a valve body having a chamber; means forming a port at one end of the chamber; means forming an arcuate surface exposed in the chamber and facing the port; a tubular control member in the chamber having one end projecting beyond said port, and having its other end engaging said arcuate surface; means preventing passage of fluid outwardly of the port along the exterior of said tubular member while permitting angular movement of the tubular member to move its said other end along said arcuate surface; resilient means urging the tubular member against said arcuate surface; selectively operable means for angularly moving the said other end of said tubular member between opposite limits along said arcuate surface from a neutral position; means forming a first passage opening into said arcuate surface and registering with said other end of said tubular member when the tubular member is at one of said limits; means forming a second passage opening into said arcuate surface and registering with said other end of said tubular member when the tubular member is at the other of said limits; the other end of said tubular member being sealed by engagement with said arcuate surface at said neutral position; means continuously establishing a net hydraulic pressure differential between said first and second passages; and a reversible hydraulic motor connected between the said one end of said tubular member and said chamber.

2. The combination as set forth in claim 1 in which the size of the opening in the control member at said other end is enlarged relative to the size of the opening in the control member at said one end whereby the pressure of fluid in said control member may overpower said resilient means to move the control member away from said arcuate surface, thereby relieving excess pressure in the hydraulic motor while the tubular member is at said neutral position.

3. The combination as set forth in claim 1 in which the size of the opening in the control member at said other end is reduced relative to the size of the opening in the control member at said one end whereby the pressure of fluid in said control member urges the control member into engagement with said arcuate surface to ensure against release of fluid from said hydraulic motor upon an increased pressure therein while said tubular member is at said neutral position.

References Cited in the file of this patent
UNITED STATES PATENTS

| | | |
|---|---|---|
| 1,763,994 | Thoma | June 17, 1930 |
| 1,873,405 | Hodgkins | Aug. 23, 1932 |
| 2,350,662 | Adams | June 6, 1944 |
| 2,373,226 | Coates | Apr. 10, 1945 |
| 2,433,405 | Stamm | Dec. 30, 1947 |
| 2,436,992 | Ernst | Mar. 2, 1948 |
| 2,742,919 | Ray | Apr. 24, 1956 |